(12) United States Patent
Kashyap

(10) Patent No.: US 10,747,556 B2
(45) Date of Patent: Aug. 18, 2020

(54) SERVERLESS FUNCTION AS A SERVICE (FAAS)

(71) Applicant: SAP SE, Walldorf (DE)

(72) Inventor: Rahul Kashyap, Delhi (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/164,500

(22) Filed: Oct. 18, 2018

(65) Prior Publication Data

US 2020/0125376 A1 Apr. 23, 2020

(51) Int. Cl.
| | |
|---|---|
| *G06F 9/451* | (2018.01) |
| *G06F 3/0482* | (2013.01) |
| *G06F 16/18* | (2019.01) |
| *G06F 9/54* | (2006.01) |

(52) U.S. Cl.
CPC ............ *G06F 9/451* (2018.02); *G06F 3/0482* (2013.01); *G06F 9/54* (2013.01); *G06F 16/18* (2019.01); *G06F 2203/04804* (2013.01)

(58) Field of Classification Search
USPC ................................. 715/745, 735, 736, 768
See application file for complete search history.

(56) References Cited

U.S. PATENT DOCUMENTS

| | | | | |
|---|---|---|---|---|
| 10,282,689 | B1 * | 5/2019 | Johnston | G06Q 10/0633 |
| 2006/0061597 | A1 * | 3/2006 | Hui | G06F 3/0481 |
| | | | | 345/629 |
| 2009/0276771 | A1 * | 11/2009 | Nickolov | G06F 9/4856 |
| | | | | 717/177 |
| 2011/0035760 | A1 * | 2/2011 | Paquette | G06F 9/451 |
| | | | | 719/329 |
| 2017/0161288 | A1 * | 6/2017 | Feldman | G06F 16/13 |
| 2017/0192827 | A1 * | 7/2017 | Ghafourifar | G06F 9/543 |
| 2017/0315789 | A1 * | 11/2017 | Lam | G06Q 10/067 |

FOREIGN PATENT DOCUMENTS

WO  WO-2013077538 A1 * 5/2013 ............ G06F 21/577

* cited by examiner

*Primary Examiner* — Christopher J Fibbi
(74) *Attorney, Agent, or Firm* — Schwegman Lundberg & Woessner, P.A.

(57) ABSTRACT

In an example, a registration request is received from an application provider, the registration request including one or more application programming interfaces (APIs) providing software code for interfacing with a cloud-based application provided by the application provider. The APIs are scanned to identify potential events triggered during execution of the cloud-based application. A graphical user interface (GUI) is caused to be rendered for a customer who has subscribed to the cloud-based application, the GUI providing a first area in which one or more of the potential events are rendered along with a selectable GUI element for each of the rendered one or more potential events and a second area in which the customer may type or upload one or more functions to be executed by the cloud-based application upon triggering of one or more corresponding potential events that have been selected by the customer via their corresponding selectable GUI elements.

20 Claims, 7 Drawing Sheets

SERVERLESS FUNCTION AS A SERVICE (FAAS)

TECHNICAL FIELD

This document generally relates to systems and methods for cloud applications. More specifically, this document relates to serverless function as a service (FAAS).

BACKGROUND

Cloud computing is an Information Technology (IT) paradigm that enables ubiquitous access to shared pools of configurable system resources and higher-level services that can be rapidly provisioned with minimal management effort, typically over the Internet. Cloud computing providers often permit companies who wish to distribute and operate cloud-based applications ("application providers") to utilize centralized computing devices without the need for the individual companies to purchase or maintain their own resources.

When an application provider delivers an application into the cloud, however, each of the application provider's customers may have different requirements. In a public cloud scenario, it is often necessary for each customer to be treated the same. Hence it becomes difficult for a product to cater functionalities to each customer, and thus becomes difficult to keep each customer happy.

In the past there have been some attempts at solution to this problem using extensibilities, user-defined flows, and event-driven architecture. These help to at least give some options to the customer so the customer can implement the specific application instances on his or her own, by obtaining the callback as and when required.

The product may perform some processing and have the end result pushed to an external system. This external system is customer-specific. Thus, the original application can raise some events and the customer-specific application running on the external system can listen for those events and implement a custom implementation where data is pushed to an appropriate system.

The problem with such a solution is that each customer has to design a system that has to listen to events that the non-customized application raises, and implement the logic to do the same. The cost (in money and resources) in doing this causes many customers to hesitate to utilize such a solution.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a serverless architecture is utilized in conjunction with a cloud platform that allows customers to register events for an application. The customer is able to utilize a flexible embodiment to select all of the events that are a part of a subscribed application, and for each event he or she can write an implementation for handling the event. This implementation is then also stored in the cloud platform, eliminating the need for the customer to host his or her own event-handling implementation.

The implementations are written in the form of functions, and those functions are executed in response to events for that customer, raised by the corresponding applications. The system may integrate with any of the applications from the provider side so that all the events are stored in one place. Thus, for example, a customer may wish to register events for five different applications. Rather than writing five different implementations and storing these five different implementations separately, in an example embodiment only one implementation needs to be written, and it can be stored in the serverless architecture in the cloud platform to provide the desired functionality as a function as a service (FAAS).

Each application is integrated with the FAAS. All of the events are drained into the application. When a customer subscribes to an application, he or she may be presented with an interface indicating all of the possible events he or she can register for. Registration then involves the customer inputting the function(s) to be executed in response to the corresponding event(s).

Each application can be integrated by informing the cloud platform of the potential events that can occur. These potential events may then be surfaced in a graphical user interface to customers to select and register for. The architectural style in which a corresponding application programming interface (API) for each language is written may be Representational State Transfer (REST). Such APIs are then known as RESTful. In an example embodiment, the cloud platform exposes these RESTful APIs for each of the integrated applications to obtain a list of the potential events raised by each of the integrated applications.

Much of the above functionality may be implemented in the cloud platform in what will be called a "multi-tenant end-user interface application."

Figure 1:
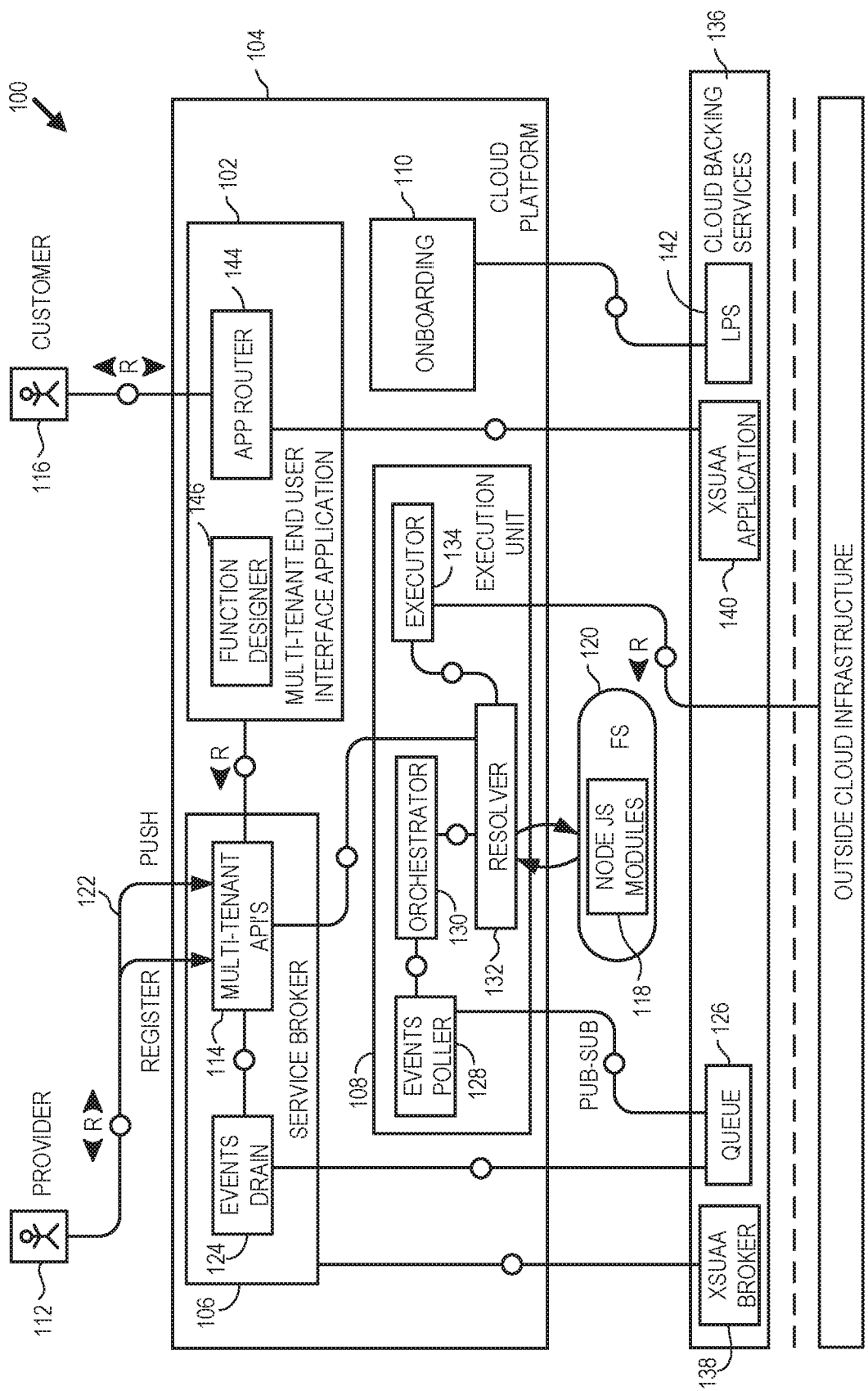
FIG. 1 is a block diagram illustrating a system including a multi-tenant end-user interface application, in accordance with an example embodiment.

FIG. 1 is a block diagram illustrating a system 100 including a multi-tenant end-user interface application 102, in accordance with an example embodiment. The multi-tenant end-user interface application 102 may operate on a cloud platform 104. The cloud platform 104 may additionally include a service broker 106, execution unit 108, and onboarding component 110.

An application provider 112 (e.g., the application developer) will register its APIs 114 with the service broker 106. The multi-tenant end-user interface application 102 then exposes these APIs 114 to reveal the potential events for the application. These potential events may then be presented to a customer 116 via a graphical user interface (GUI), assuming the customer 116 has subscribed to the corresponding application via the GUI. The GUI may, for example, permit the customer 116 to select particular events to which a function will be provided. The GUI may then, for example, provide an area in which the customer 116 may type or upload one or more functions to be executed upon detection of each selected event. These one or more functions may be written, for example, in JavaScript or another function scripting language. These functions may be stored by the cloud platform 104 for later use, for example as node JavaScript modules 118 in a file system 120.

When an event is published by the application, it may be received via a push flow 122 by the service broker 106. An events drain 124 obtains the published events and puts them in a queue 126, to be handled one at a time. In an example embodiment, the queue 126 may be implemented as part of an in-memory persistence environment that also provides secondary persistence on disk, such as Redis. An in-memory persistence environment (also known as an in-memory database) is a database management system that primarily relies on main memory for computer data storage. It is contrasted with database management systems that employ a disk storage mechanism.

An events poller 128 within the execution unit 108 may then periodically poll the queue 126 for events. The events poller 128 then sends the events one at a time to an orchestrator 130. The orchestrator 130 attempts to call a resolver 132 to try to find out, for this customer, which is the function that the customer has written for the event/application pair, by accessing the node JavaScript modules 118 in the file system 120. The appropriate implementation(s) that the customer has written may be passed to an executor 134, which can execute the corresponding code (e.g., JavaScript).

The queue 126 described earlier may be stored, for example, by a cloud backing services layer 136. The cloud backing services layer 136 may additionally contain and implement XSUAA plans, which are used to provide authentication and authorization for multi-tenant scenarios. As such, the cloud backing services layer 136 may also contain an XSUAA broker 138, which applies the XSUAA plan to service broker implementations that are generally consumed over RESTful APIS, and an XSUAA application 140, which applies the XSUAA plan to user interface variant applications. The cloud backing services layer 136 may additionally contain a local provisioning service (LPS) 142, which aids in registering applications so that if anyone subscribes the provider of the cloud platform 104 is alerted.

The onboarding component 110 initializes aspects of the system 100 when customers subscribe to an application.

The multi-tenant end-user interface application 102 may include an application router 144, which is a library that enables multi-tenant support for the user interface. The multi-tenant end-user interface application 102 may additionally include a function designer 146, which allows a user to design the JavaScript functions.

Figure 2:
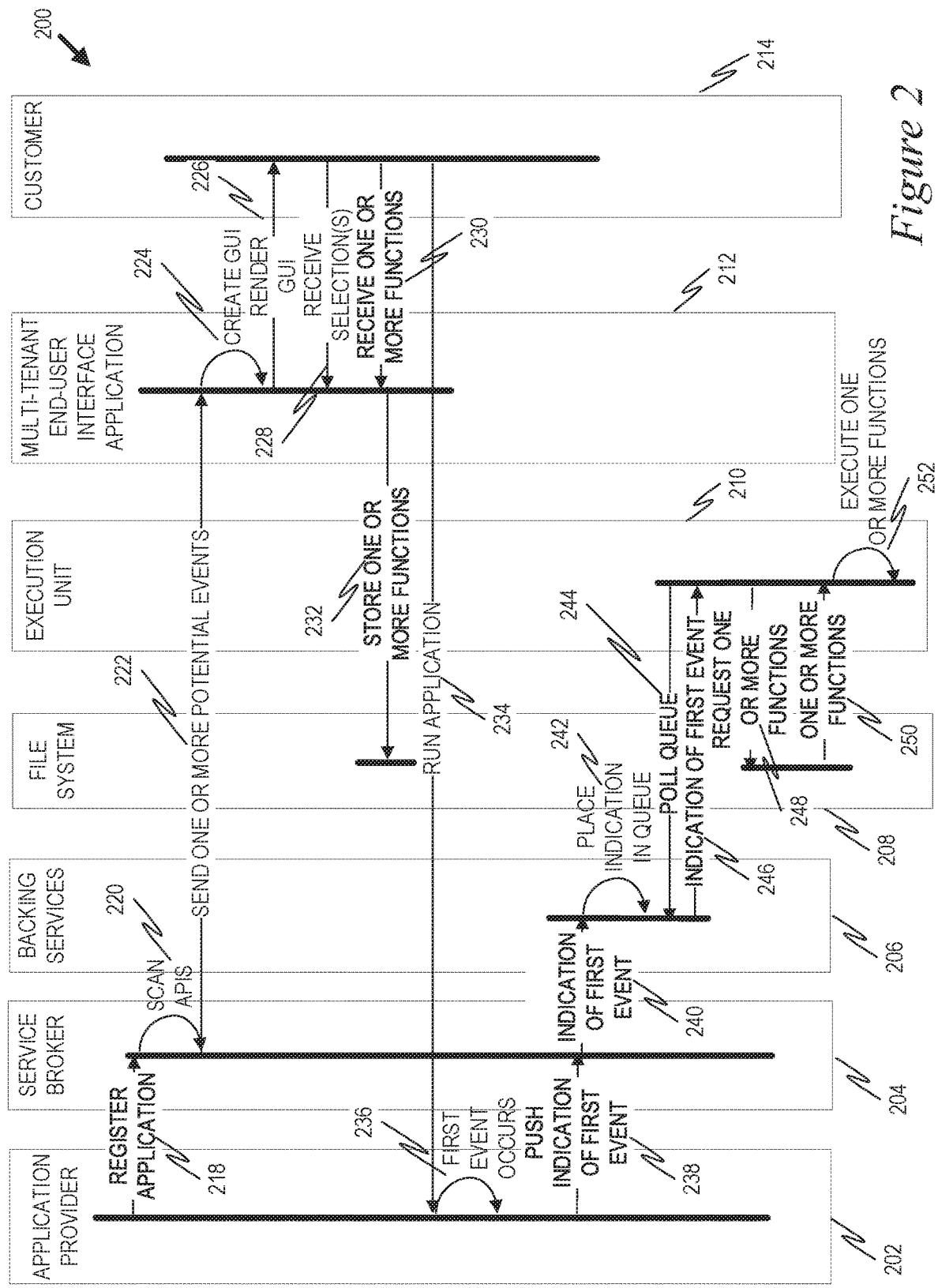
FIG. 2 is a ladder diagram illustrating a method of providing cloud-based application event handling in accordance with an example embodiment.

FIG. 2 is a ladder diagram illustrating a method of providing cloud-based application event handling in accordance with an example embodiment. A system 200 includes an application provider 202, a service broker 204, backing services 206, a file system 208, an execution unit 210, a multi-tenant end-user interface application 212, and a customer 214. The service broker 204, backing services 206, file system, execution unit 210, and multi-tenant end-user interface application 212 may be provided by a serverless cloud architecture At operation 218, the application provider 202 registers an application with the service broker 204. This may include sending a registration request to the service broker 204 that includes, or at least identifies, one or more APIs used to interface with the corresponding application. At operation 220, the service broker 204 scans the one or more APIs to identify one or more potential events triggered during execution of the corresponding application.

At operation 222, the identified one or more potential events are passed to the multi-tenant end-user interface application 212. At operation 224, the multi-tenant end-user interface application 212 creates a GUI that includes at least two areas. A first area of the GUI displays one or more of the identified potential events along with a selectable GUI element for each of the identified potential events. This allows a viewer of the GUI to select particular potential events of interest. A second area of the GUI permits the viewer to type or upload one or more functions to be executed upon triggering of the corresponding potential event(s). In an example embodiment, these one or more functions may be written in a scripting language, such as JavaScript.

At operation 226, the GUI is rendered for the customer 214. At operation 228, the customer 214 selects one or more of the potential events, and at operation 230, the customer types or uploads one or more corresponding functions.

At operation 232, the multi-tenant end-user interface application 212 stores the one or more functions in the file system 208.

At some point later, the customer 214 may run the application hosted by the application provider 202, at operation 234. It should be noted that in this context the term "customer" shall be interpreted broadly to include any individual associated with the customer. In many instances, for example, the customer may be a company, and the individuals associated with the customer may include employees or other authorized individuals of the company. In that respect, one individual, such as an Information Technology (IT) professional in the company, may select the potential events and type or upload the functions, while a different individual, such as a vice president of finance, may run the application hosted by the application provider 202.

At operation 236, during execution of the application, a first event occurs. At operation 238, the application provider 202 sends an indication that the first event has occurred to the service broker 204. This indication may be transmitted, for example, via a push operation. At operation 240, the service broker 204 may send the indication to the backing services 206, which at operation 242 store it in a queue. In an example embodiment, the queue is implemented as part of an in-memory persistence environment.

Sometime later, at operation 244, the execution unit 210 polls the backing services 206 to obtain any indications of events stored in the queue. These events are obtained and processed one at a time. In the example depicted in FIG. 2, assume that there is only one event (the first event) in the queue. The operations involved in polling and processing this event may be repeated in the case that there are additional events in the queue. Thus, at operation 246, the backing services 206 send the indication of the first event to the execution unit 210.

At operation 248, the execution unit 210 requests the one or more functions corresponding to the first event from the file system 208. At operation 250, the file system 208 returns the one or more functions corresponding to the first event. At operation 252, the execution unit 210 executes the one or more functions corresponding to the first event.

Figure 3:
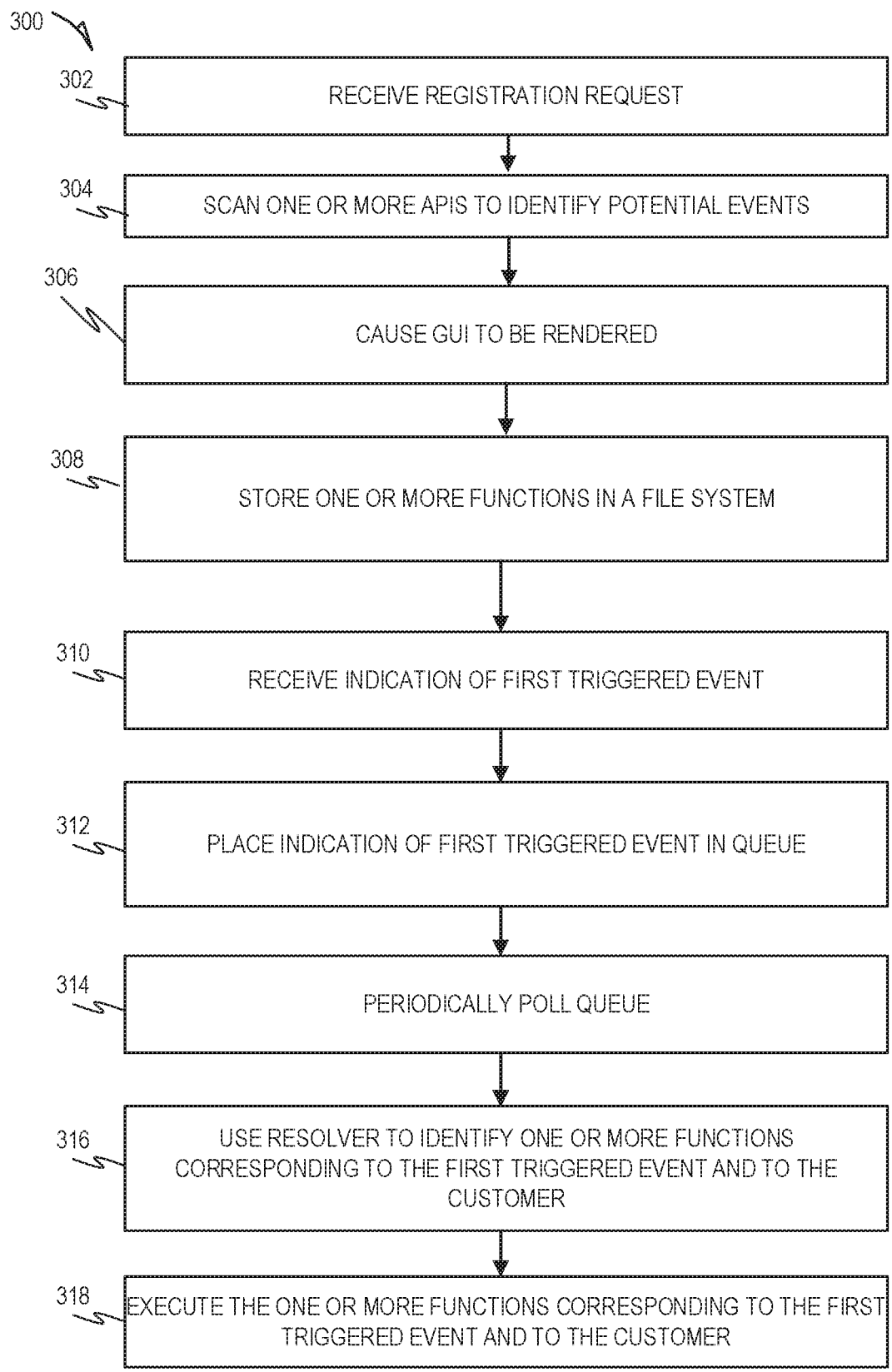
FIG. 3 is a flow diagram illustrating a method of providing cloud-based application event handling in accordance with an example embodiment.

FIG. 3 is a flow diagram illustrating a method 300 of providing cloud-based application event handling in accordance with an example embodiment. At operation 302, a registration request is received from an application provider. The registration request may include one or more application programming interfaces (APIs) providing software code for interfacing with a cloud-based application provided by the application provider. At operation 304, the one or more APIs are scanned to identify potential events triggered during execution of the cloud-based application. At operation 306, a GUI is caused to be rendered for a customer who has subscribed to the cloud-based application, the GUI providing a first area in which one or more of the potential events are rendered along with a selectable GUI element for each of the rendered one or more potential events. The GUI further provides a second area in which the customer may type or upload one or more functions to be executed by the cloud-based application upon triggering of one or more corresponding potential events that have been selected by the customer via their corresponding selectable GUI elements.

At operation 308, the one or more functions are stored in a file system. At operation 310, an indication of a first triggered event is received from the cloud-based application. This indication may include, for example, an identification of the customer. At operation 312, in response to the receiving of the indication of the first triggered event, the indication of the first triggered event is placed in a queue. At operation 314, the queue is periodically polled for indications of events. At operation 316, in response to the polling of the queue, a resolver is used to identify one or more functions, corresponding to the first triggered event and to the customer, stored in the file system. Then at operation 318, the one or more functions corresponding to the first triggered event and to the customer are executed.

Figure 4:
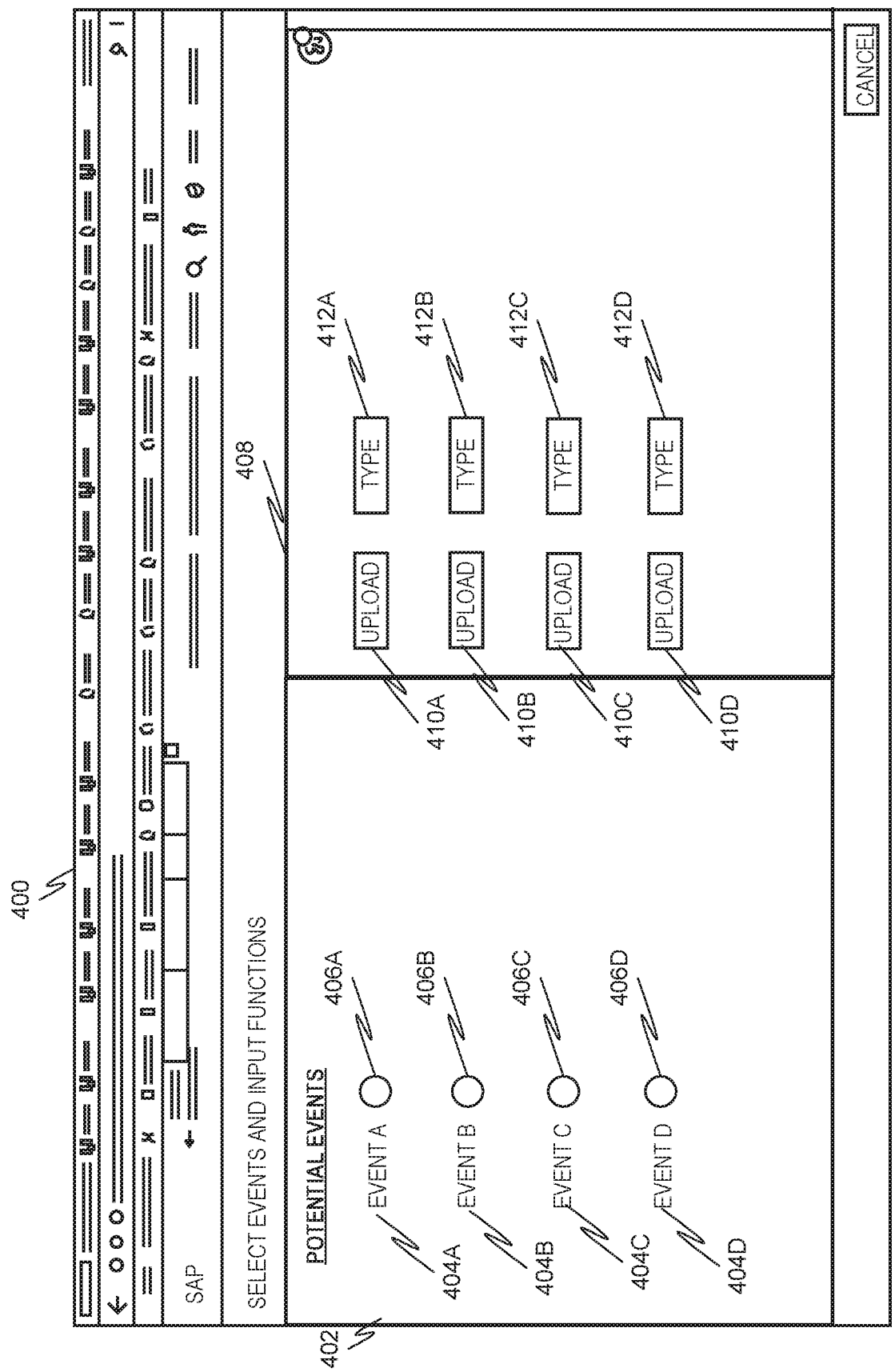
FIG. 4 is a screen diagram illustrating an example graphical user interface (GUI) in accordance with an example embodiment.

FIG. 4 is a screen diagram illustrating an example GUI 400 in accordance with an example embodiment. This example GUI 400 may be presented to a customer for selection of one or more potential events associated with a cloud-based application. The example GUI 400 may include a first area 402 where one or more potential events 404A-404D are presented, along with corresponding selectable GUI elements 406A-406D. Here, the selectable GUI elements 406A-406D are in the form of selectable buttons.

A second area 408 of the example GUI 400 is also provided, where a customer can type or upload one or more functions corresponding to each of the selected potential events. Here, this is depicted in the form of an upload button 410A-410D corresponding to each potential event and a type button 412A-412D corresponding to each potential event. If the viewer selects an upload button 410A-410D, he or she may be presented with a different screen or window where the viewer can select a local file to upload. If the viewer selects a type button 412A-412D, he or she may be presented with a different screen or window where the viewer can type text for the corresponding function(s).

It should also be noted that while the first area 402 and second area 408 are depicted here as part of the same screen, in some example embodiments they are presented on different screens. For example, the viewer may select multiple of the selectable GUI elements 406A-406D and select a different button to indicate that his or her selections are complete, at which point the second area 408 may be depicted on a separate screen. Additionally, the second area 408 itself may be split across multiple screens in order to present a single type and/or upload area per screen (thus, a different screen for each of the selected potential events).

Figure 5:
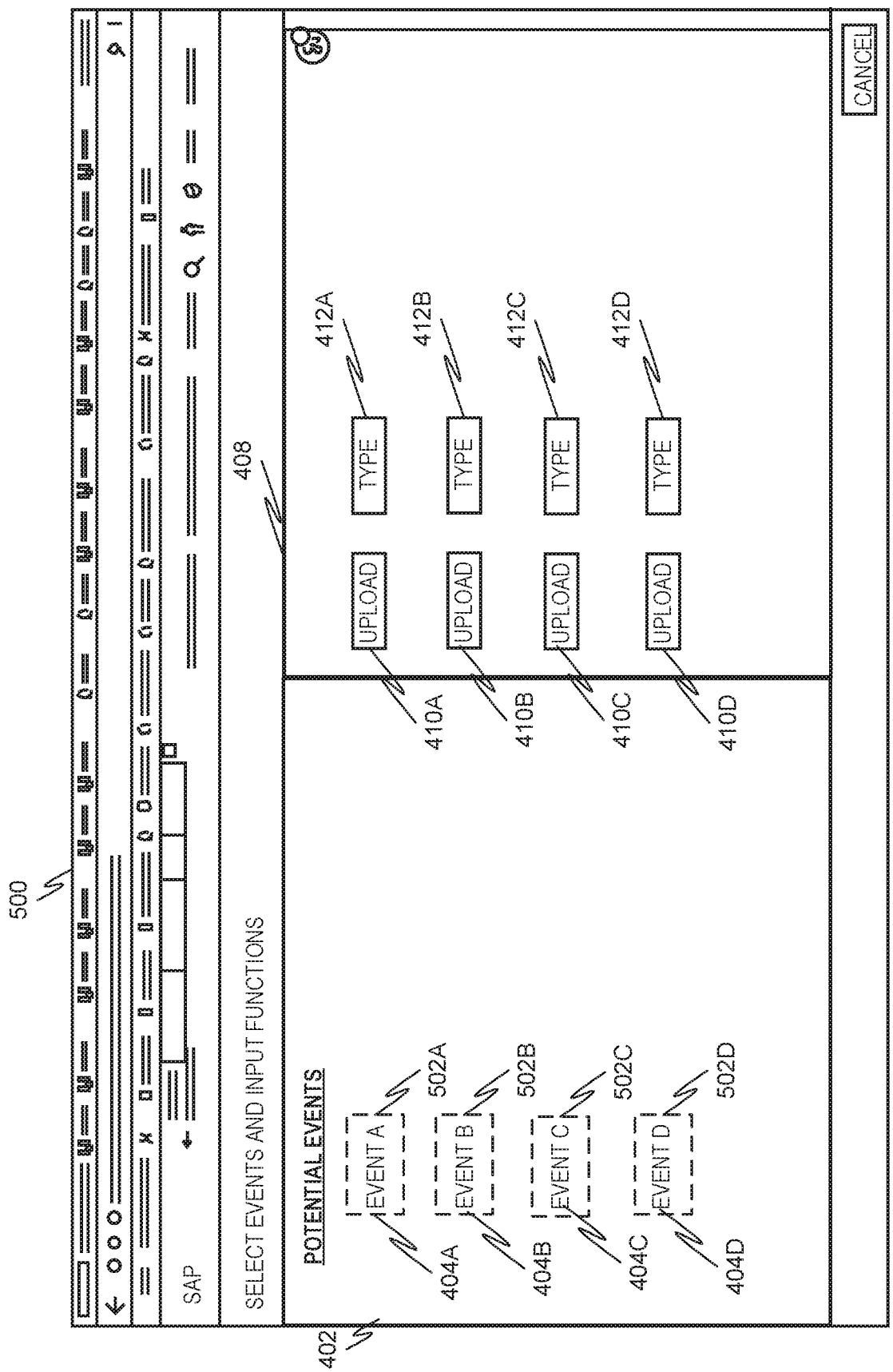
FIG. 5 is a screen diagram illustrating an example GUI in accordance with an example embodiment.

FIG. 5 is a screen diagram illustrating an example GUI 500 in accordance with an example embodiment. This example GUI 500 is similar to the example GUI 400 of FIG. 4, except here selectable GUI elements 502A-502D are in the form of transparent overlays rendered over the corresponding potential events 404A-404D. These transparent overlays are still selectable, although they appear to the viewer as if the user is directly selecting the text of the corresponding potential events 404A-404D (the dashed lines depicted in this figure are merely for defining the edges of the selectable areas and are not actually visible to the viewer).

EXAMPLES

Example 1

A system comprising:
at least one hardware processor; and
a computer-readable medium storing instructions that, when executed by the at least one hardware processor, cause the at least one hardware processor to perform operations comprising:
  receiving a registration request from an application provider device, the registration request including one or more application programming interfaces (APIs) providing software code for interfacing with a cloud-based application provided by the application provider device;
  scanning the one or more APIs to identify potential events triggered during execution of the cloud-based application; and
  causing a graphical user interface (GUI) to be rendered for a customer device that has subscribed to the cloud-based application, the GUI providing a first area in which one or more of the potential events are rendered along with a selectable GUI element for each of the rendered one or more potential events, the GUI further providing a second area in which a user may type or upload one or more functions to be executed by the cloud-based application upon triggering of one or more corresponding potential events that have been selected by the user via their corresponding selectable GUI elements.

Example 2

The system of Example 1, wherein the operations further comprise:
storing the one or more functions in a file system.

Example 3

The system of Examples 1 or 2, wherein the one or more functions are written in a scripting language.

Example 4

The system of Example 2, wherein the operations further comprise:

receiving an indication of a first triggered event from the cloud-based application, the indication including an identification of the user;

in response to the receiving of the indication of the first triggered event, placing the indication of the first triggered event in a queue;

periodically polling the queue for indications of events;

in response to the polling of the queue, using a resolver to identify a function, corresponding to the first triggered event and to the user, stored in the file system; and causing execution of the function corresponding to the first triggered event and to the user.

Example 5

The system of Example 4, wherein the queue is implemented as part of an in-memory persistence environment.

Example 6

The system of any of Examples 1-5, wherein the selectable GUI element is a button.

Example 7

The system of any of Examples 1-6, wherein the selectable GUI element is at least partially transparent and is rendered over a corresponding potential event in the first area.

Example 8

A method comprising:

receiving a registration request from an application provider device, the registration request including one or more application programming interfaces (APIs) providing software code fir interfacing with a cloud-based application provided by the application provider device;

scanning the one or more APIs to identify potential events triggered during execution of the cloud-based application; and causing a graphical user interface (GUI) to be rendered for a customer device that has subscribed to the cloud-based application, the GUI providing a first area in which one or more of the potential events are rendered along with a selectable GUI element for each of the rendered one or more potential events, the GUI further providing a second area in which a user may type or upload one or more functions to be executed by the cloud-based application upon triggering of one or more corresponding potential events that have been selected by the user via their corresponding selectable GUI elements.

Example 9

The method of Example 8, further comprising:

storing the one or more functions in a file system.

Example 10

The method of Example 8 or 9, wherein the one or more functions are written in a scripting language.

Example 11

The method of Example 9, further comprising:

receiving an indication of a first triggered event from the cloud-based application, the indication including an identification of the user;

in response to the receiving of the indication of the first triggered event, placing the indication of the first triggered event in a queue;

periodically polling the queue for indications of events;

in response to the polling of the queue, using a resolver to identify a function, corresponding to the first triggered event and to the user, stored in the file system; and causing execution of the function corresponding to the first triggered event and to the user.

Example 12

The method of Example 11, wherein the queue is implemented as part of an in-memory persistence environment.

Example 13

The method of any of Examples 8-12, wherein the selectable GUI element is a button.

Example 14

The method of any of Examples 8-13, wherein the selectable GUI element is at least partially transparent and is rendered over a corresponding potential event in the first area.

Example 15

A non-transitory machine-readable medium storing instructions which, when executed by one or more processors, cause the one or more processors to perform operations comprising:

receiving a registration request from an application provider device, the registration request including one or more application programming interfaces (APIs) providing software code for interfacing with a cloud-based application provided by the application provider device;

scanning the one or more APIs to identify potential events triggered during execution of the cloud-based application; and causing a graphical user interface (GUI) to be rendered for a customer device that has subscribed to the cloud-based application, the GUI providing a first area in which one or more of the potential events are rendered along with a selectable GUI element for each of the rendered one or more potential events, the GUI further providing a second area in which a user may type or upload one or more functions to be executed by the cloud-based application upon triggering of one or more corresponding potential events that have been selected by the user via their corresponding selectable GUI elements.

Example 16

The non-transitory machine-readable medium of Example 15, wherein the operations further comprise:
storing the one or more functions in a file system.

Example 17

The non-transitory machine-readable medium of Example 15 or 16, wherein the one or more functions are written in a scripting language.

Example 18

The non-transitory machine-readable medium of Example 16, wherein the operations further comprise:
receiving an indication of a first triggered event from the cloud-based application, the indication including an identification of the user;
in response to the receiving of the indication of the first triggered event, placing the indication of the first triggered event in a queue;
periodically polling the queue for indications of events;
in response to the polling of the queue, using a resolver to identify a function, corresponding to the first triggered event and to the user, stored in the file system; and
causing execution of the function corresponding to the first triggered event and to the user.

Example 19

The non-transitory machine-readable medium of Example 18, wherein the queue is implemented as part of an in-memory persistence environment.

Example 20

The non-transitory machine-readable medium of any of Examples 15-19, wherein the selectable GUI element is a button.

Figure 6:
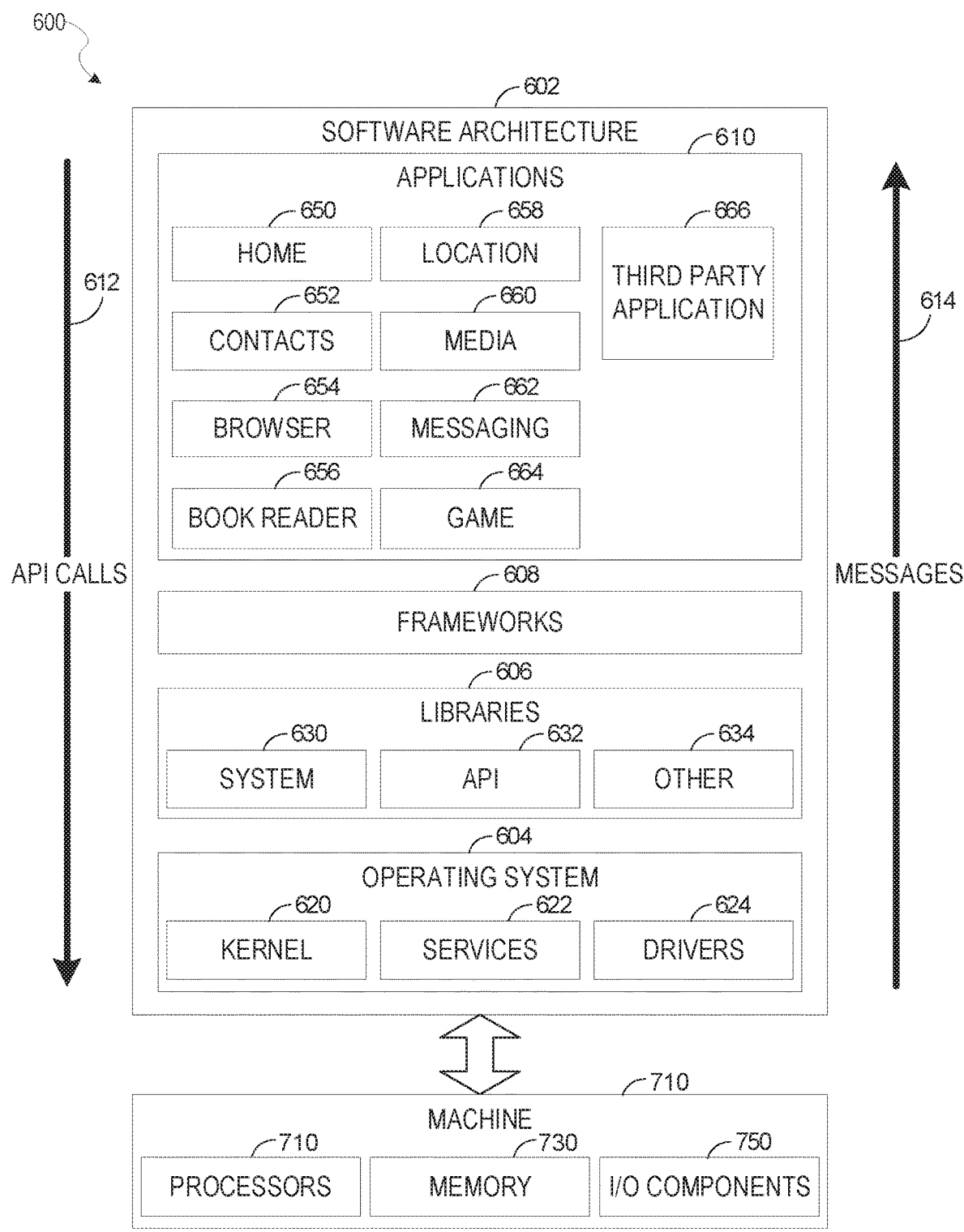
FIG. 6 is a block diagram illustrating an architecture of software, which can be installed on any one or more of the devices described above.

FIG. 6 is a block diagram 600 illustrating an architecture of software 602, which can be installed on any one or more of the devices described above. FIG. 6 is merely a non-limiting example of a software architecture, and it will be appreciated that many other architectures can be implemented to facilitate the functionality described herein. In various embodiments, the software 602 is implemented by hardware such as a machine 700 of FIG. 7 that includes processors 710, memory 730, and input/output (I/O) components 750. In this example architecture, the software 602 can be conceptualized as a stack of layers where each layer may provide a particular functionality. For example, the software 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
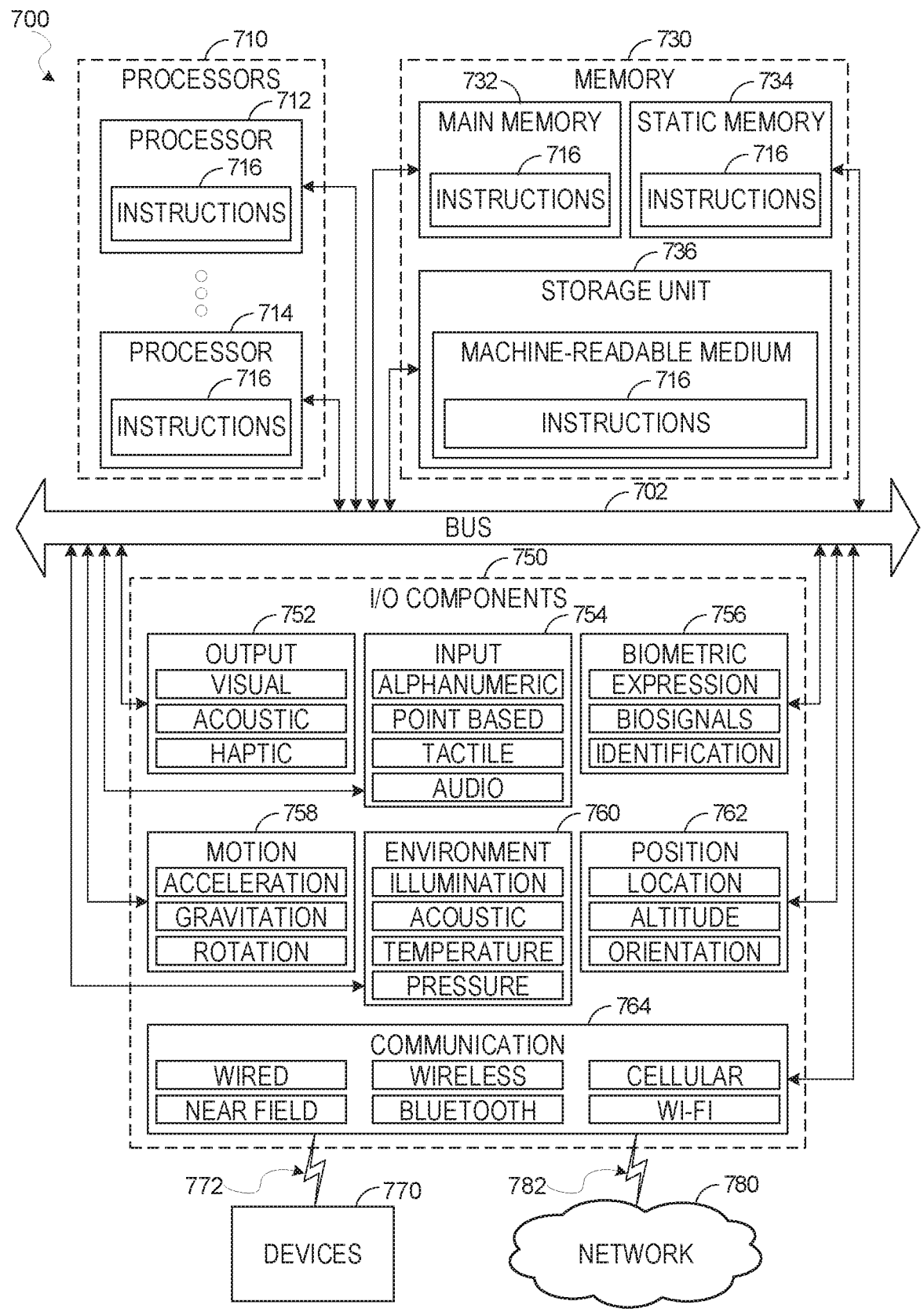
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method 300 of FIG. 3. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a. Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving a registration request from an application provider device, the registration request including one or more application programming interfaces (APIs) providing software code for interfacing with a cloud-based application provided by the application provider device;

scanning the one or more APIs to identify potential events triggered during execution of the cloud-based application; and causing a graphical user interface (GUI) to be rendered for a customer device that has subscribed to the cloud-based application, the GUI providing a first area in which one or more of the potential events are rendered along with a selectable GUI element for each of the rendered one or more potential events, the GUI further providing a second area in which a user may type or upload one or more functions to be executed by the cloud-based application upon triggering of one or more corresponding potential events that have been selected by the user via their corresponding selectable GUI elements.

2. The system of claim 1, wherein the operations comprise:
storing the one or more functions in a file system.

3. The system of claim 1, wherein the one or more functions are written in a scripting language.

4. The system of claim 2, wherein the operations comprise:
receiving an indication of a first triggered event from the cloud-based application, the indication including an identification of the user;
in response to the receiving of the indication of the first triggered event, placing the indication of the first triggered event in a queue;
periodically polling the queue for indications of events;
in response to the polling of the queue, using a resolver to identify a function, corresponding to the first triggered event and to the user, stored in the file system; and
causing execution of the function corresponding to the first triggered event and to the user.

5. The system of claim 4, wherein the queue is implemented as part of an in-memory persistence environment.

6. The system of claim 1, wherein the selectable GUI element is a button.

7. The system of claim 1, wherein the selectable GUI element is at least partially transparent and is rendered over a corresponding potential event in the first area.

8. A method comprising:
receiving, via a computer network, a registration request from an application provider device, the registration request including one or more application programming interfaces (APIs) providing software code for interfacing with a cloud-based application provided by the application provider device;
scanning the one or more APIs to identify potential events triggered during execution of the cloud-based application; and
causing a graphical user interface (GUI) to be rendered for a customer device that has subscribed to the cloud-based application, the GUI providing a first area in which one or more of the potential events are rendered along with a selectable GUI element for each of the rendered one or more potential events, the GUI further providing a second area in which a user may type or upload one or more functions to be executed by the cloud-based application upon triggering of one or more corresponding potential events that have been selected by the user via their corresponding selectable GUI elements.

9. The method of claim 8, further comprising:
storing the one or more functions in a file system.

10. The method of claim 8, wherein the one or more functions are written in a scripting language.

11. The method of claim 9, further comprising:
receiving an indication of a first triggered event from the cloud-based application, the indication including an identification of the customer;
in response to the receiving of the indication of the first triggered event, placing the indication of the first triggered event in a queue;
periodically polling the queue for indications of events;
in response to the polling of the queue, using a resolver to identify a function, corresponding to the first triggered event and to the customer, stored in the file system; and
causing execution of the function corresponding to the first triggered event and to the customer.

12. The method of claim 11, wherein the queue is implemented as part of an in-memory persistence environment.

13. The method of claim 8, wherein the selectable GUI element is a button.

14. The method of claim 8, wherein the selectable GUI element is at least partially transparent and is rendered over a corresponding potential event in the first area.

15. A non-transitory machine-readable medium storing instructions which, when executed by one or more processors, cause the one or more processors to perform operations comprising:
receiving a registration request from an application provider device, the registration request including one or more application programming interfaces (APIs) providing software code for interfacing with a cloud-based application provided by the application provider device;
scanning the one or more APIs to identify potential events triggered during execution of the cloud-based application; and
causing a graphical user interface (GUI) to be rendered for a customer device that has subscribed to the cloud-based application, the GUI providing a first area in which one or more of the potential events are rendered along with a selectable GUI element for each of the rendered one or more potential events, the GUI further providing a second area in which a user may type or upload one or more functions to be executed by the cloud-based application upon triggering of one or more corresponding potential events that have been selected by the user via their corresponding selectable GUI elements.

16. The non-transitory machine-readable medium of claim 15, wherein the operations further comprise:
storing the one or more functions in a file system.

17. The non-transitory machine-readable medium of claim 15, wherein the one or more functions are written in a scripting language.

18. The non-transitory machine-readable medium of claim 16, wherein the operations further comprise:
receiving an indication of a first triggered event from the cloud-based application, the indication including an identification of the user;
in response to the receiving of the indication of the first triggered event, placing the indication of the first triggered event in a queue;
periodically polling the queue for indications of events;
in response to the polling of the queue, using a resolver to identify a function, corresponding to the first triggered event and to the user, stored in the file system; and causing execution of the function corresponding to the first triggered event and to the user.

19. The non-transitory machine-readable medium of claim 18, wherein the queue is implemented as part of an in-memory persistence environment.

20. The non-transitory machine-readable medium of claim 15, wherein the selectable GUI element is a button.

* * * * *